US011923633B2

United States Patent
Stevens et al.

(10) Patent No.: US 11,923,633 B2
(45) Date of Patent: Mar. 5, 2024

(54) CONNECTOR AND CONNECTOR INSERT FOR PROTECTING CONDUCTOR SPRING-ELEMENTS

(71) Applicant: John Mezzalingua Associates, LLC, Liverpool, NY (US)

(72) Inventors: Brandon Stevens, Liverpool, NY (US); Nikhil Balakdas Meshram, Liverpool, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 368 days.

(21) Appl. No.: 16/981,151

(22) PCT Filed: Mar. 14, 2019

(86) PCT No.: PCT/US2019/022237
§ 371 (c)(1),
(2) Date: Sep. 15, 2020

(87) PCT Pub. No.: WO2019/178340
PCT Pub. Date: Sep. 19, 2019

(65) Prior Publication Data

US 2021/0066841 A1 Mar. 4, 2021

Related U.S. Application Data

(60) Provisional application No. 62/644,204, filed on Mar. 16, 2018.

(51) Int. Cl.
*H01R 13/502* (2006.01)
*H01R 13/631* (2006.01)
(Continued)

(52) U.S. Cl.
CPC ......... *H01R 13/502* (2013.01); *H01R 13/631* (2013.01); *H01R 24/40* (2013.01); *H01R 2103/00* (2013.01); *H01R 2201/24* (2013.01)

(58) Field of Classification Search
CPC .... H01R 13/502; H01R 13/631; H01R 24/40; H01R 2103/00; H01R 2201/24; H01R 24/542; H01R 13/05; H01R 13/64
See application file for complete search history.

(56) References Cited

U.S. PATENT DOCUMENTS 10,122,131 B2 * 11/2018 Stevens .................. H01R 24/40
2007/0161288 A1 7/2007 Entsfellner
(Continued)

OTHER PUBLICATIONS

International Searching Authority, International Search Report/ Written Opinion, dated Jul. 3, 2019; dated Jul. 3, 2019; pp. 11.
(Continued)

*Primary Examiner* — Abdullah A Riyami
*Assistant Examiner* — Nader J Alhawamdeh
(74) *Attorney, Agent, or Firm* — Barclay Damon LLP

(57) ABSTRACT

A connector, and connector insert, configured to inhibit plastic deformation of at least one of the axially projecting fingers of an outer conductor basket associated with a connector. The connector insert comprises: (i) an outwardly facing flange configured to engage a shoulder formed at a base of the axially projecting fingers of the outer conductor basket, (ii) a tubular structure defining an elongate axis and having plurality of engagement sections extending normal to the outwardly facing flange, each engagement section having a surface disposed substantially normally to a radial projecting from the elongate axis; and (iii) a plurality of stiffening sections having a surface disposed substantially parallel to a radial projecting from the elongate axis. The engagement sections function to prevent plastic deformation of the axially projecting fingers, thereby preventing damage
(Continued)

to the fingers and/or the transmission of RF signals The stiffening sections function to support the engagement sections while furthermore preventing the insertion of a non-mating second connector into, or against, the outer conductor basket of a first connector.

17 Claims, 7 Drawing Sheets

(51) Int. Cl.

*H01R 24/40* (2011.01)
*H01R 103/00* (2006.01)

(56) References Cited

U.S. PATENT DOCUMENTS

| | | | | |
|---|---|---|---|---|
| 2007/0224880 | A1 | 9/2007 | Wlos | |
| 2010/0186228 | A1 | 7/2010 | Montena | |
| 2012/0252265 | A1* | 10/2012 | Wild .................... | H01R 24/564 439/578 |
| 2015/0333419 | A1* | 11/2015 | Eriksen ................ | H01R 9/0518 439/578 |
| 2016/0322751 | A1* | 11/2016 | Van Swearingen .... | H01R 13/64 |
| 2016/0336676 | A1* | 11/2016 | Stevens .............. | H01R 13/6583 |
| 2021/0066841 | A1* | 3/2021 | Stevens .................. | H01R 13/05 |

OTHER PUBLICATIONS

International Searching Authority, International Preliminary Report on Patentability; dated Sep. 22, 2020; pp. 7.

* cited by examiner

CONNECTOR AND CONNECTOR INSERT FOR PROTECTING CONDUCTOR SPRING-ELEMENTS

BACKGROUND

Telecommunications systems often employ hardline connectors for data transfer between telecom components, e.g., a Remote Radio Unit (RRU) and a telecommunications sector antenna. These hardline connectors often employ an arrangement of spring-biased fingers/elements for making the requisite electrical connections, e.g., signal or electrical ground connections, from one connector to a mating connector. One type of connector, known as a 4.3-10 Connector, commonly employs a multi-fingered inner conductor socket surrounded by a multi-fingered outer connector basket which receive an inner conductor pin and an outer conductor sleeve, respectively, of an adjoining/opposing connector.

The geometric similarity between connectors, in combination with the difficulty associated with physically making an electrical connection, i.e., fifty (50) feet in the air, can cause Linemen to improperly/incorrectly join connectors. While connectors which do not properly mate will, in most instances, not be able to be joined (i.e., to affect a viable telecommunications connection), the attempt alone can damage or, otherwise distort, at least one of the conductors.

Particularly vulnerable are the fingers of the outer conductor basket. For example, a Mini-Din connector, which is also an RF connector used in the telecommunications industry, is sufficiently similar in appearance that one might inadvertently try to connect a Mini-Din plug to a 4.3-10 jack. Unfortunately, when applying the requisite force to establish the connection, the structure of the Mini-Din plug may press against and force the finger elements of the 4.3-10 outer conductor basket in an outwardly direction. Not only does this cause an improper RF connection, but it can damage the 4.3-10 jack, requiring that it be replaced. Inasmuch as the connector is, most often, an integral component of an electronic component, e.g., a Remote Radio Unit or an antenna, a seemingly small amount of damage to the connector can incapacitate a very costly piece of telecommunications equipment, i.e., a component which may cost between $20K to $40K to replace.

Therefore, a need exists to overcome, or otherwise lessen the effects of, the disadvantages and shortcomings described above.

BRIEF DESCRIPTION OF THE DRAWINGS

Additional features and advantages of the present disclosure are described in, and will be apparent from, the following Brief Description of the Drawings and Detailed Description.

SUMMARY OF THE INVENTION

Figure 1:
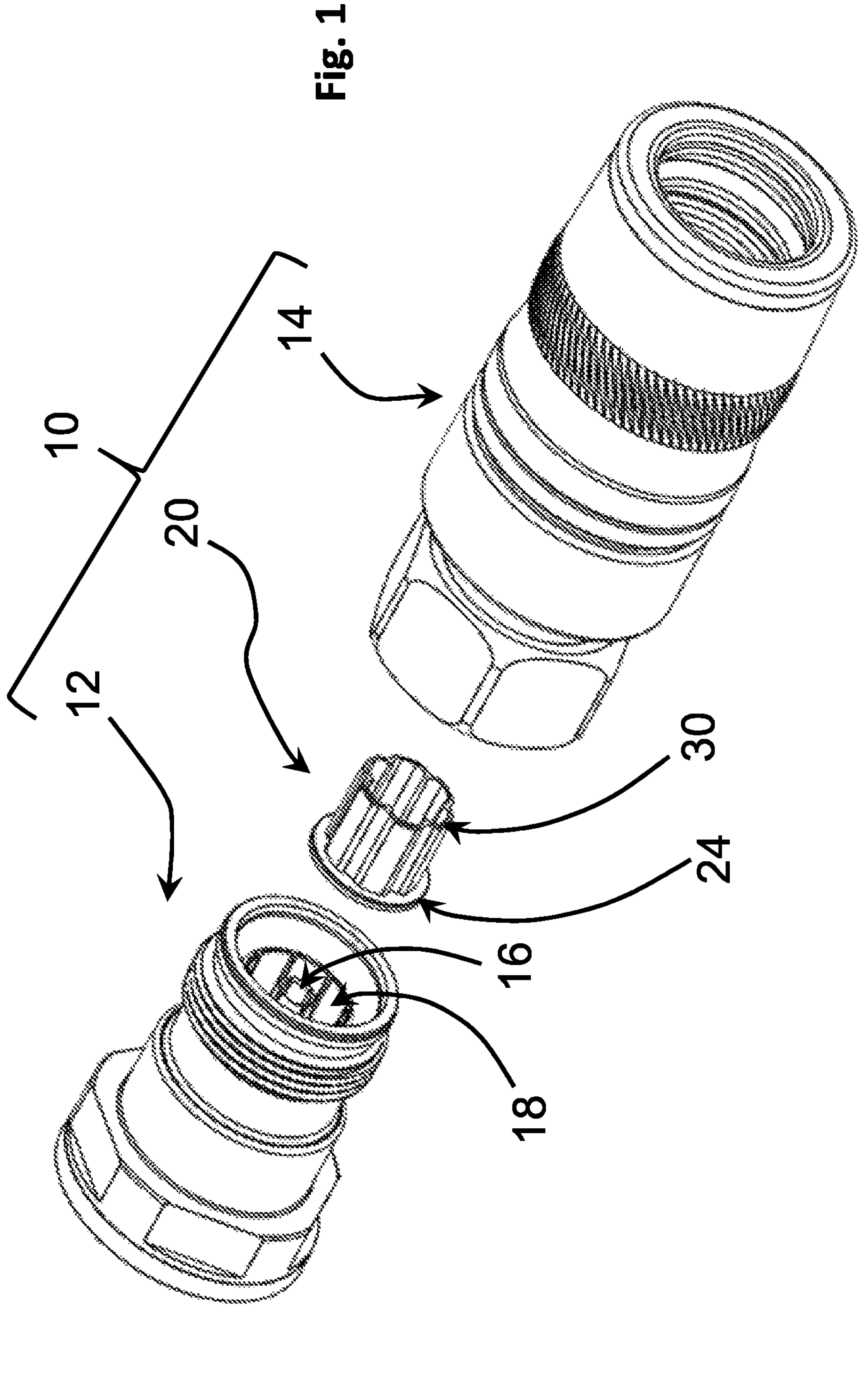
FIG. 1 is an exploded view of a 4.3-10 connector including: (a) a first connector or connector portion comprising a multi-fingered inner conductor socket surrounded by multi-fingered outer conductor basket, (b) a second connector or connector portion comprising an inner conductor pin surrounded by a cylindrical sleeve, and (c) a corrugated, pedal-shaped cylindrical wall or tube disposed between the socket and the basket configured to: (i) inhibit plastic deformation of the axially projecting fingers of the outer conductor basket should a mating connector be insert at a damaging angle or inclination, or (ii) prevent insertion of a non-mating connector between the socket and the basket so as to protect/support the outer conductor basket.

In one embodiment of the disclosure, a connector is provided comprising a center or inner conductor socket, an outer conductor basket and an inhibitor or insert disposed between the inner conductor socket and the outer conductor basket. The inner conductor socket transmits RF signals from one connector portion to another connector portion across a mating interface. The outer conductor basket comprises a plurality of axially projecting fingers configured to electrically ground the connector. The inhibitor comprises an insert disposed along the outwardly facing surface of the outer conductor basket to prevent damage to the axially projecting fingers in an unassembled condition/state, thereby ensuring electrical connectivity of the fingers in an assembled condition/state. Functionally, the insert prohibits insertion of a non-mating connector so as to prevent plastic deformation of the axially projecting fingers and permanent distortion thereof which would otherwise prevent a proper electrical connection between the fingers of the basket and a cylindrical outer conductor sleeve of a mating connector. Specifically, the insert is configured to prevent one of the following: (i) insertion of a non-mating connector between the socket and basket of the other connector, (ii) misalignment of a pair of mating connectors during assembly of the connectors, and (iii) plastic deformation of at least one of the axially projecting fingers of the mating connectors.

In another embodiment, a connector insert is configured to inhibit plastic deformation of at least one of the axially projecting fingers of an outer conductor basket associated with one of the connectors. The connector insert comprises: (i) an outwardly facing flange configured to engage a shoulder formed at a base of the axially projecting fingers of the outer conductor basket, (ii) a tubular structure defining an elongate axis and having plurality of engagement sections extending normal to the outwardly facing flange, and (iii) a plurality of stiffening sections having a surface disposed substantially parallel to a radial projecting from the elongate axis. Each of the engagement sections also have a surface disposed substantially normally to a radial projecting from the elongate axis.

The engagement sections function to prevent plastic deformation of the axially projecting fingers, thereby preventing damage to the fingers and/or the transmission of RF signals. The stiffening sections function to support the engagement sections, while furthermore, preventing the insertion of a non-mating second connector into, or against, the outer conductor basket of a first connector.

DETAILED DESCRIPTION

A connector is described including first and second connectors or connector portions each comprising electrically-connecting inner and outer conductors. While the connector includes first and second mating connector portions, it should be understood and appreciated that, in the context used herein, a "connector" means either or both of the connector portions.

The following describes a connector, for example, a 4.3-10 connector, and a protective insert for inhibiting or mitigating damage to a multi-fingered spring-biased outer conductor basket of the connector. While the insert is particularly useful for 4.3-10 connectors, it should be appreciated that the protective insert, and the teachings associate therewith, are equally applicable to a wide-variety of telecommunications/signal connectors. The protective insert of the present disclosure has utility when the 4.3-10 connector is unassembled, and/or is being prepared for assembly. Specifically, the insert prevents damage to a first connector in the event that a non-mating second connector, i.e., a connector of a different size or variety, such as a Mini-Din connector, is forcibly urged into engagement with the first connector. As such, the protective insert may prevent a costly error.

In FIG. 1, a pair of mating connectors 10 is depicted including a first connector 12 and a second connector 14 each having an inner conductor 16 and an outer conductor 18. An inhibitor or insert 20 is disposed in combination with at least one of the connectors 12, and in the illustrated embodiment, the insert 20 is disposed between a multi-fingered inner conductor socket 16, and a multi-fingered outer conductor basket 18 of the first connector 12. The 4.3-10 connectors 10 of the type described herein may have an impedance of about fifty Ohms (50Ω) with a frequency range of between about one kilohertz (1.0 kHz) to about six gigahertz (6.0 GHz.), although variations to the connector parameters are possible and within the scope of the disclosure.

Figure 2:
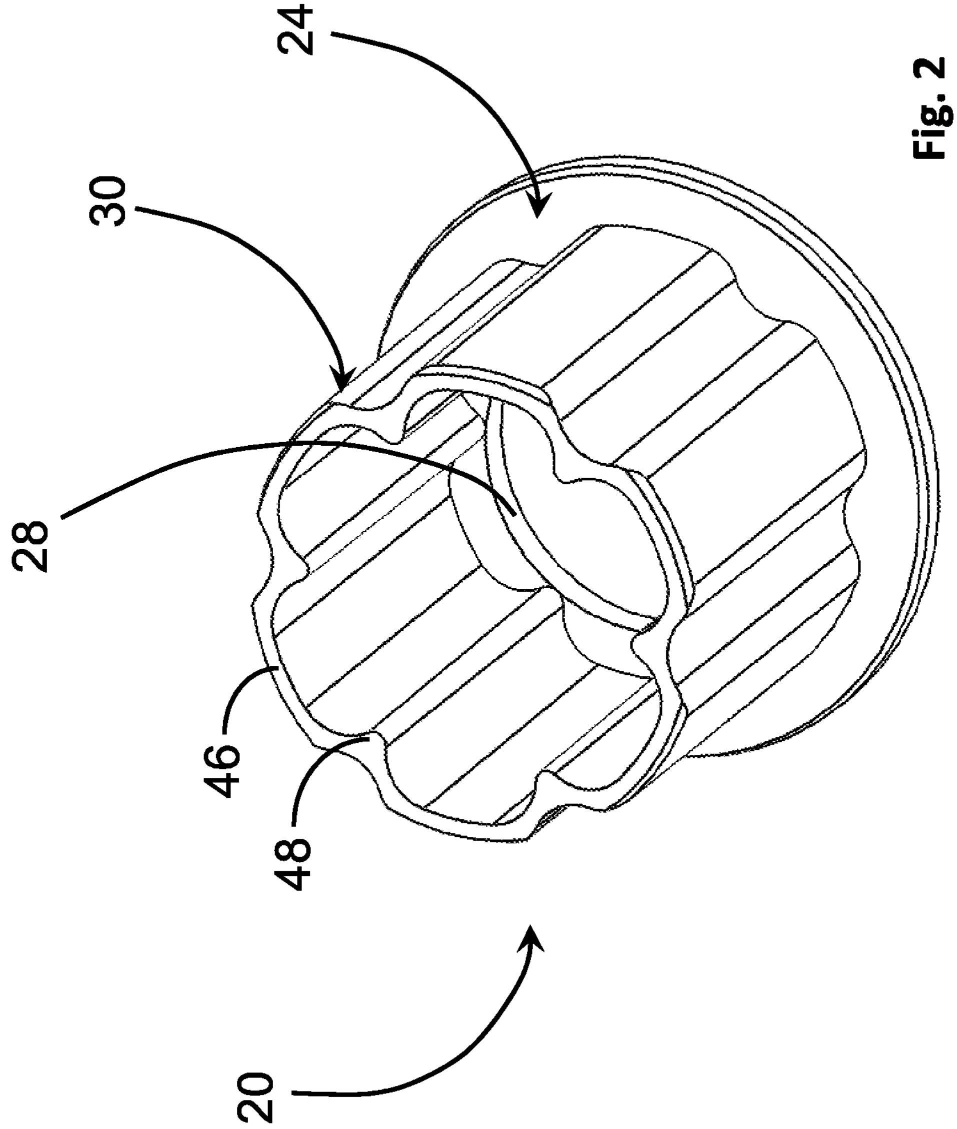
FIG. 2 is an enlarged, isolated, perspective view of the insert according to the teachings of the present disclosure.
Figure 4:
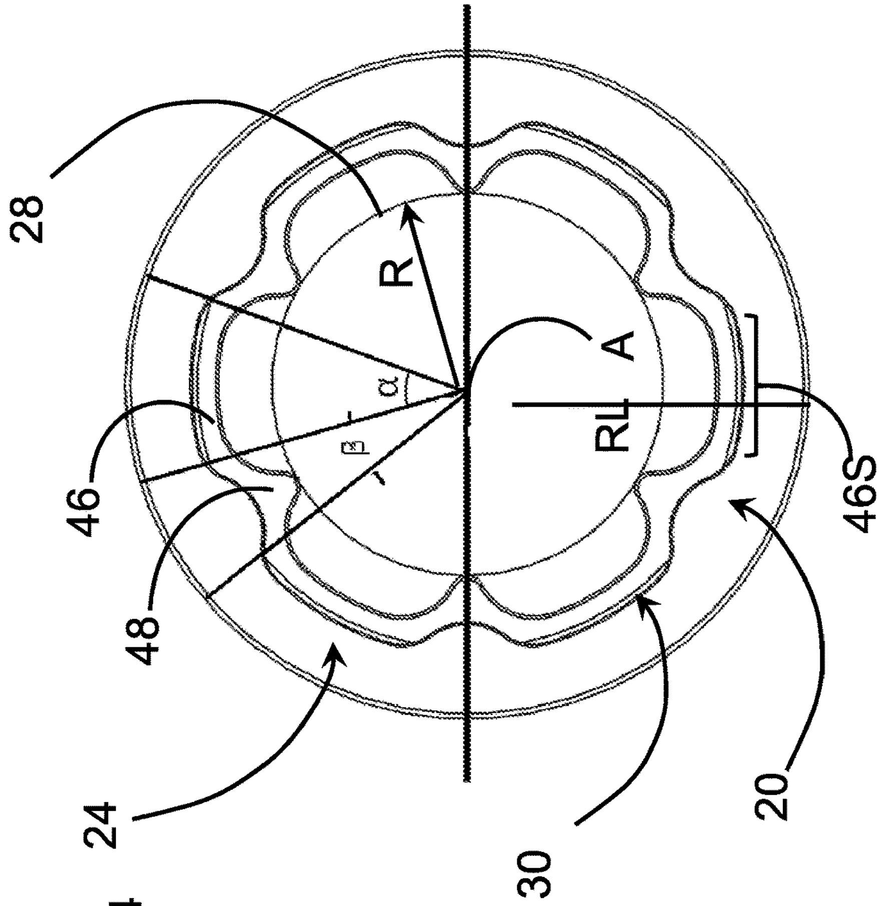
FIG. 4 is an enlarged, isolated, front view of the insert according to the teachings of the present disclosure.
Figure 3:
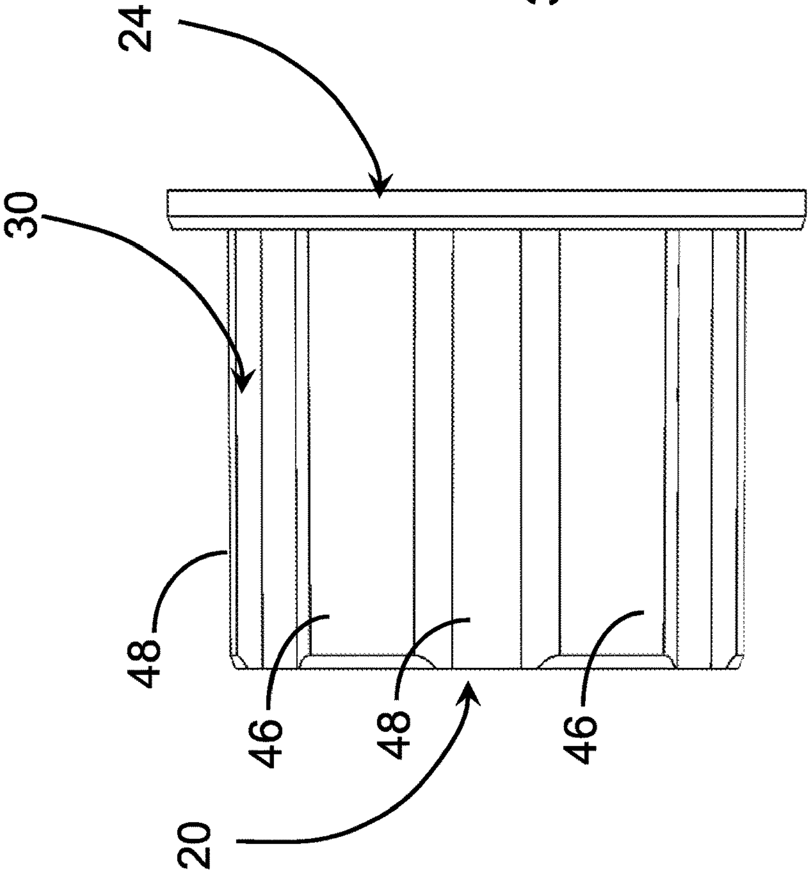
FIG. 3 is an enlarged, isolated, side view of the insert according to the teachings of the present disclosure.
Figure 5:
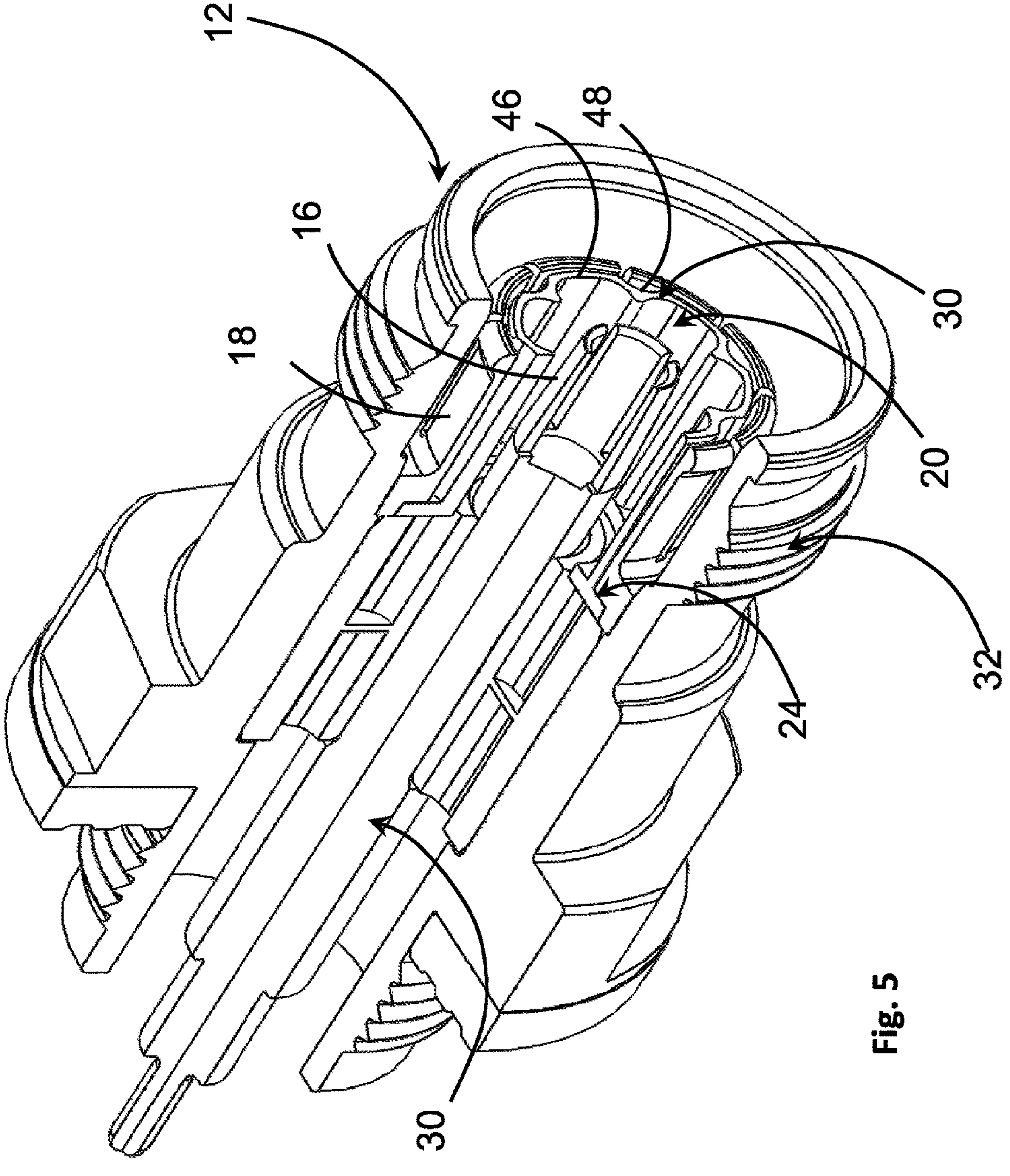
FIG. 5 is a partially broken away, sectional view of the first connector including an insert disposed between the inner conductor socket and the outer conductor basket to inhibit, block or reject attempts to mate improperly-sized connectors along with the potentially damaging consequences to the basket fingers of the outer conductor.
Figure 6:
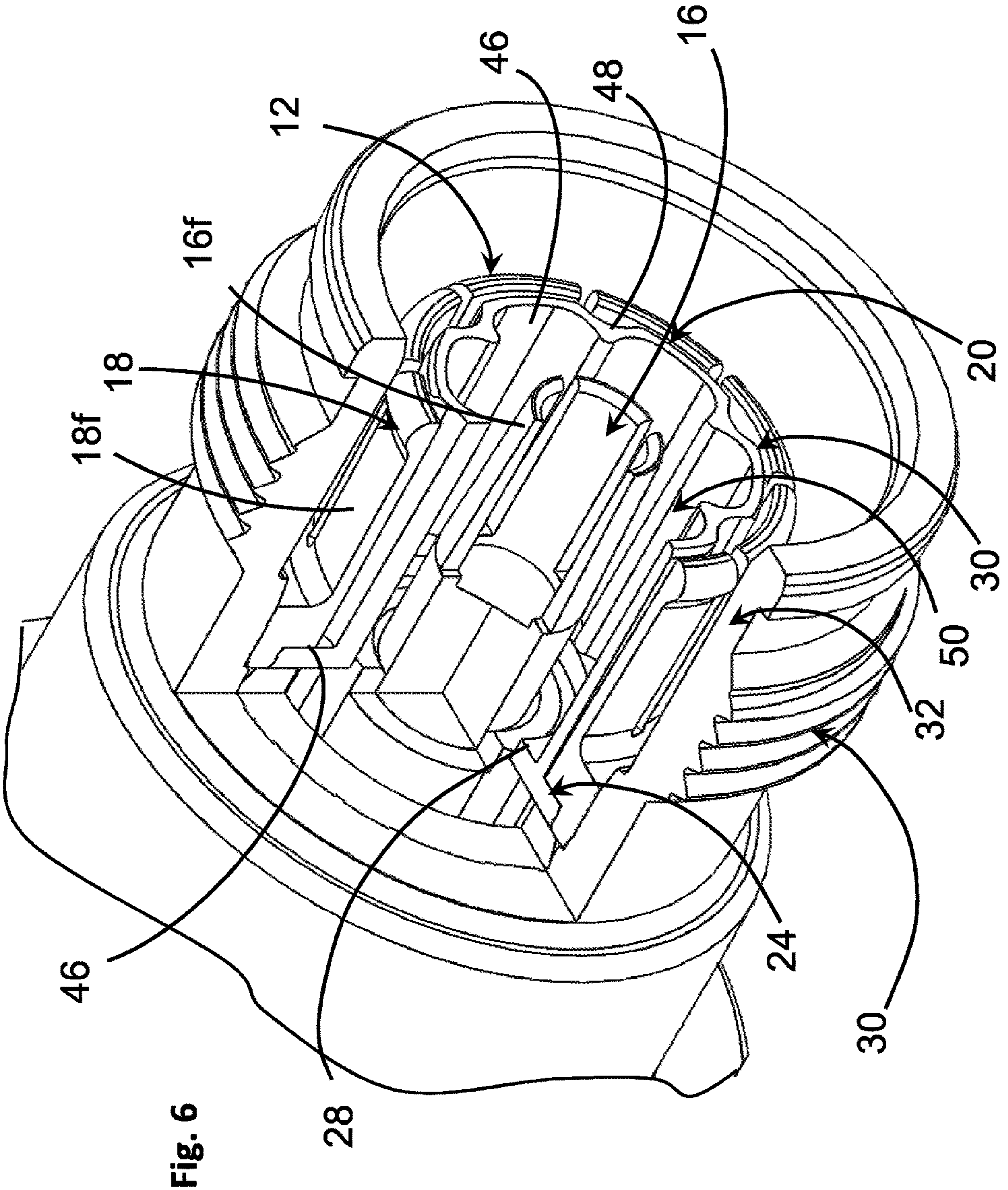
FIG. 6 is an enlarged, partially broken away and sectioned view of the first connector depicted in FIG. 5 to facilitate illustration of the relationship between, and the various features of, the basket fingers and the connector insert.

In FIGS. 2 and 6, the individual fingers 16*f* of the inner conductor socket 16 are spring-biased inwardly such that the fingers 16*f* may collectively capture or frictionally engage an inner conductor pin (not seen) of the second connector 14. Conversely, the individual fingers 18*f* of the outer conductor basket 18 are spring-biased outwardly such that the fingers 18*f* may collectively capture or frictionally engage an outer conductor sleeve of the second connector 14.

In FIGS. 2 through 6, the insert 20 defines an outwardly facing flange 24 configured to engage a shoulder 26 formed at the base of the axially projecting fingers 18*f* of the outer conductor basket 18. Furthermore, the outwardly facing flange 24 defines an aperture 28 (see FIGS. 2, 4 and 6) configured to receive the axially projecting fingers 16*f* of the inner conductor socket 16 (best seen in FIG. 6). Finally, the insert 20 comprises a corrugated, wave, or pedal-shaped tubular structure 30 defining an elongate axis A (projecting normally from a plane defined by the outwardly facing flange 24,) i.e., out of the page with respect to FIG. 4.

The corrugated, wave or pedal-shaped tube 30, furthermore, defines outwardly bulging, engagement sections 46, and inwardly projecting, stiffening sections 48 which vary in radial dimension R from the elongate axis A. To facilitate the subsequent narrative, each outwardly bulging section will be referred to as an "engagement section" and each inwardly projecting section will be referred to as a "stiffening section". In the described embodiment, the engagement section 46 includes a substantially arcuate, outwardly-facing surface 46S, which is disposed substantially normal to a radial line RL projecting from the elongate axis A. Each engagement section 46 functions to oppose the inward radial displacement of the axially projecting fingers 18*f* of the outer conductor basket 18 such that the displacement, or elongation, of the axially projecting fingers 18*f* does not extend into the plastic region or into the plastic deformation range of the strain allowable, i.e., the non-linear portion of the strain curve. That is, the engagement section 46 limits the displacement of the axially projecting fingers 18*f* such that the deformation remains in the elastic region of the material, i.e., does not extend into the plastic deformation range of the material.

In the illustrated embodiment, the insert 20 includes at least three (3) engagement sections, each spanning a first arcuate region alpha α and at least three (3) stiffening sections each spanning a second arcuate region Beta β. More specifically, each of the first arcuate regions alpha α may span an arc of at least about nighty-degrees (90) whereas each of the second arcuate regions Beta β may span an arc of at least about thirty (30) degrees. The illustrated embodiment depicts a total of six (6) engagement sections 46, and six (6) stiffening sections 48 wherein the latter form V-shaped notches between adjacent pairs of engagement sections 46. Each of the first arcuate regions alpha α span an arc of about thirty (30) degrees whereas each of the second arcuate regions Beta β span an arc of about twenty (20) degrees. About ten (10) degrees is dedicated to the transition between the engagement and stiffening sections 46, 48 or about five (5) degrees to either side of each engagement and stiffening section 46, 48.

To minimize the impact that the insert 20 has on the impedance properties of the connector 10, the stiffening sections 48 are distally spaced from the fingers 16*f* of the socket 16. More specifically, the stiffening sections 48 stop short of projecting inwardly toward the socket 16 and leave a gap between socket 16 and each stiffening section 48. In the described embodiment, the stiffening sections 48 extend inwardly to a radius which is less than about one-half (½P) of the total radius R extending from the elongate axis A to the outer surface of the tubular structure 30. More specifically, the stiffening sections 48 extend inwardly to a radius which is less than about two-thirds (⅔rds) of the total radius R. As such, the insert 20 has a singular tube 30 with a plurality of V-shaped stiffening sections or ribs 48 which do not extend or connect to an inner ring or sleeve.

Moreover, each of the stiffening sections 48 project radially inwardly relative to the engagement sections 46 and function to enhance the buckling stability of each engagement section 46. In addition to providing buckling stability, each of the stiffening sections 48 inhibit or prevent the insertion of a non-mating connector (see FIG. 7) into the annular-shaped cavity between the inner conductor socket 16 and the outer conductor basket 18 of the connector 12. The increased bending stiffness of the tubular structure 30 also prevents the axially projecting fingers 18*f* from deformation into the plastic range of the material elongation properties while promoting axial alignment of the mating connectors 12, 14. The features and function of the connector 10, along with its insert 20, are shown and described in connection with FIGS. 7 and 8.

Figure 7:
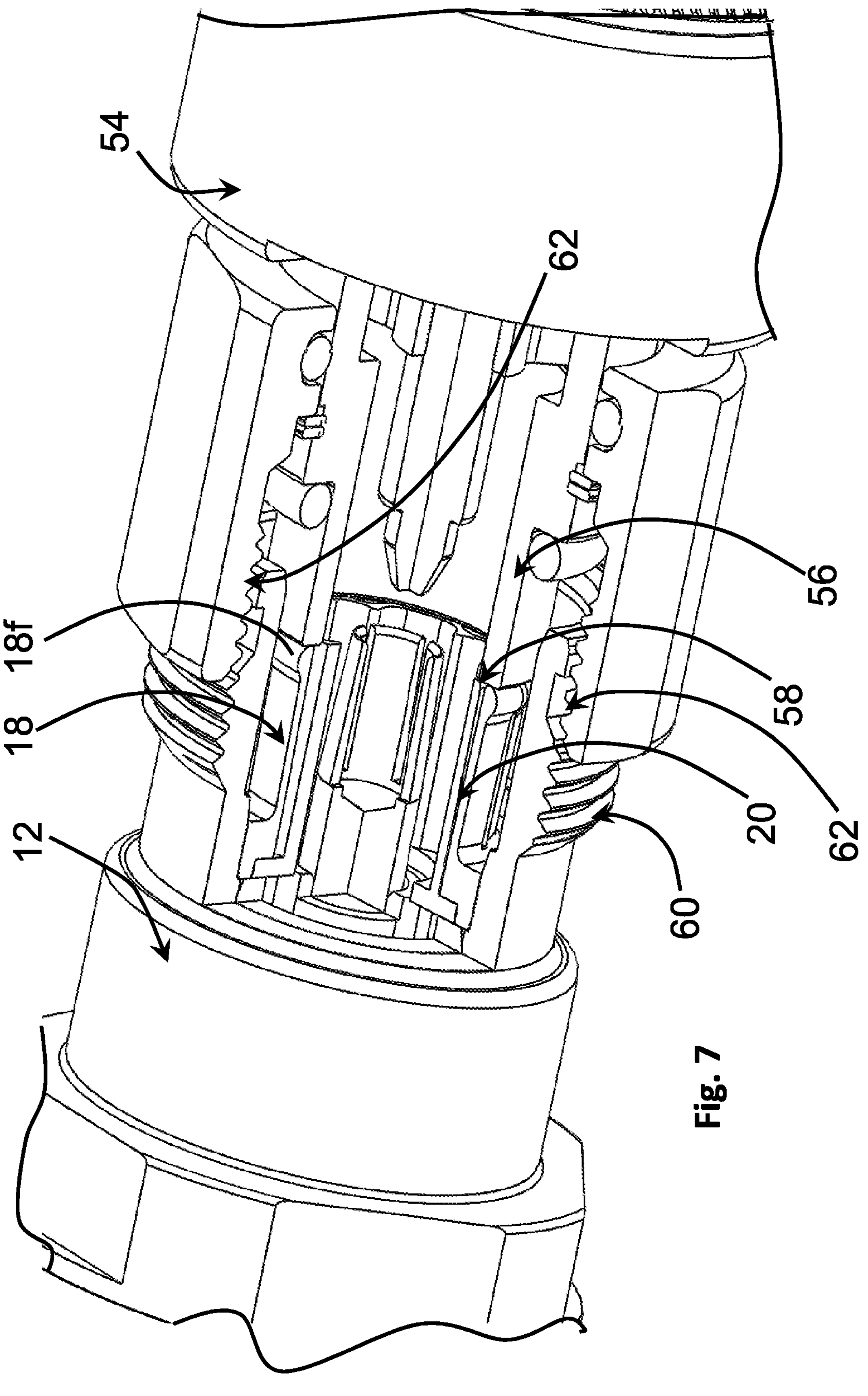
FIG. 7 depicts a view of a non-mating connector being rejected or inhibited by the insert during an attempt to join the incompatible connectors.

FIG. 7 depicts an assembly view of a non-mating second connector 54 being joined with the first connector 12. The view shows the cylindrical sleeve 56 abutting the leading or top surface 58 of the insert 20. While the male and female threads, 60 and 62, respectively, may be compatible, the insert 20 prevents the threads 60, 62 from engaging. As such, there is no opportunity for the axially projecting fingers 18*f* to be spread or damaged by the outer conductor sleeve of the non-mating second connector 54.

Figure 8:
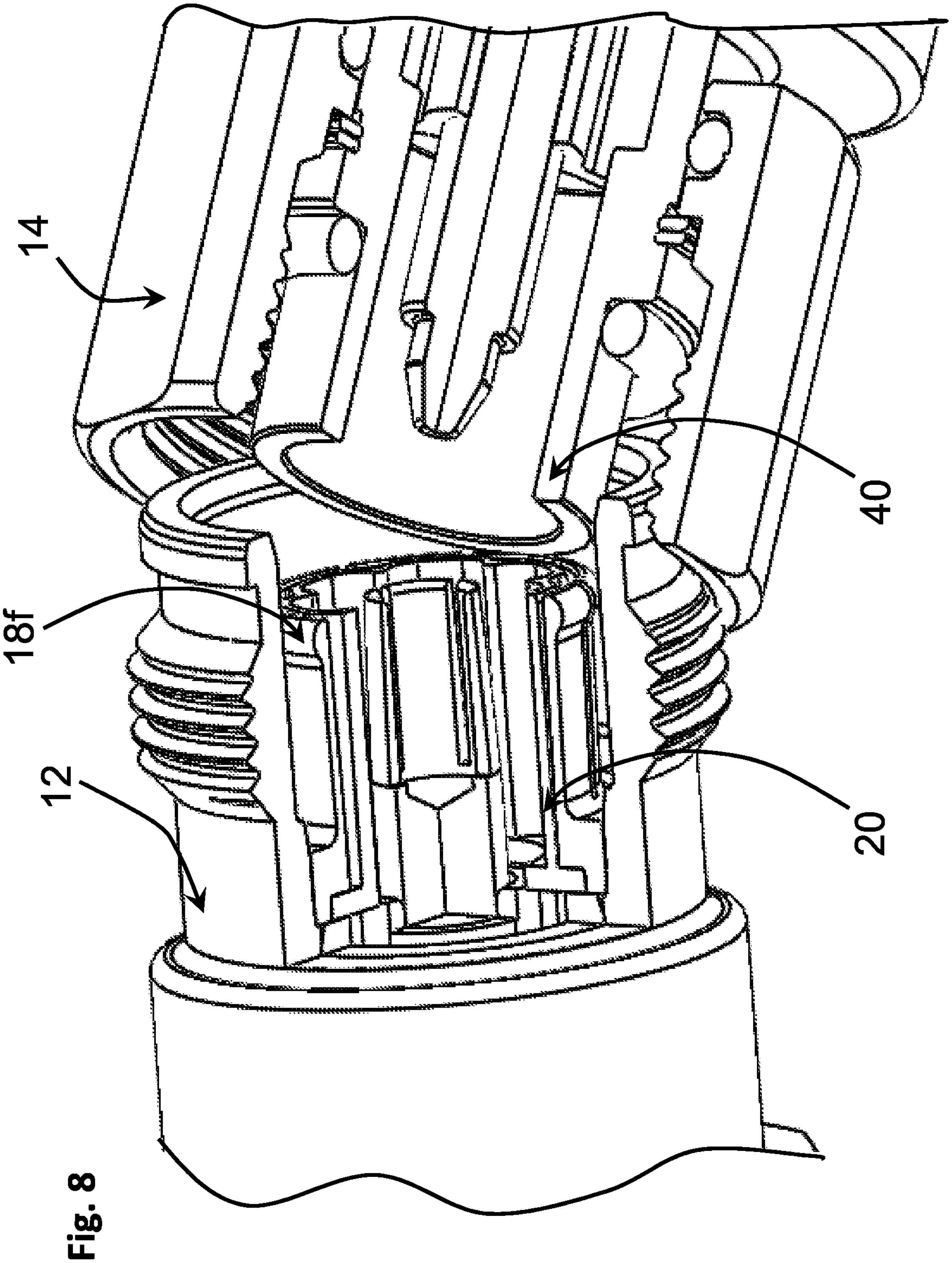
FIG. 8 depicts a view of the first and second connectors being joined at a potentially damaging angle of inclination, and the role of the insert to protect the basket fingers by preventing excessive strain or plastic deformation thereof so as to maintain the elastic properties of the basket fingers for subsequent connection with the outer conductive sleeve of the second connector.

FIG. 8 depicts a view of the first and second connectors 12, 14 being joined at a potentially damaging angle or inclination. Similar to the prior example, the role of the insert 20 is the protection of the basket fingers 18*f*. In this particular example, greater emphasis is placed on the exposure of the fingers 18*f* to excessive strain or plastic deformation. More specifically, the insert 20 is sufficiently rigid or stiff such that the fingers 18*f* are never exposed to a high level of strain, i.e., a level which would plastically deform a finger of the basket 18. Accordingly, the insert 20 promotes realignment of the connectors 12, 14 rather than damage to one of the connectors 12, 14. That is, the outer conductor sleeve 64 is guided into alignment by the insert 20.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many 50 modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The invention claimed is:

1. In a connector having a pair of mating connectors configured to transmit RF signals across an interface, at least one of the mating connectors comprising:

an inner conductor socket for transmitting the RF signals from one mating connector to the other mating connector;

an outer conductor basket, configured to electrically ground the respective one of the mating connectors;

the inner conductor socket and the outer conductor basket each having a plurality of axially projecting fingers separated by a plurality of axial slots; and, an inhibitor interposing the inner conductor socket and the outer conductor basket and comprising an insert including an outwardly facing flange configured to engage a shoulder formed at the base of the axially projecting fingers of the outer conductor basket and defining a corrugated tube projecting normally from a plane defined by the outwardly facing flange, the corrugated tube having outwardly bulging and inwardly projecting sections which vary in radial dimension from an elongate axis, the insert configured to prevent one of the: (i) insertion of a non-mating connector between the socket and basket of the other mating connector and (ii) misalignment of the pair of mating connectors during assembly of the mating connectors, wherein the insert inhibits plastic deformation of at least one of the axially projecting fingers of the mating connectors and promotes alignment of the mating connectors.

2. The connector of claim 1 wherein the outwardly facing flange includes an aperture configured to receive the axially projecting fingers of an inner conductor socket.

3. The connector of claim 1 wherein the outwardly bulging sections include at least three (3) arcuate sections spanning a first arcuate region $\alpha$ and at least three (3) inwardly projecting regions spanning a second arcuate region $\beta$, the first region being larger than the second region.

4. The connector of claim 1 wherein the corrugated tube defines a length along the elongate axis corresponding to the length of the axially projecting fingers.

5. The connector of claim 1 wherein the the corrugated tube defines a length along the elongate axis that corresponds an engagement length of the axially projecting fingers.

6. A connector configured to transmit RF signals across an interface, comprising:

an inner conductor socket for transmitting the RF signals from one of a pair of mating connectors to another of the pair of mating connectors;

an outer conductor basket, configured to electrically ground the respective one of the paor of mating connectors;

the inner conductor socket and the outer conductor basket each having a plurality of axially projecting fingers separated by a plurality of axial slots; and, an inhibitor interposing the inner conductor socket and the outer conductor basket and comprising an insert including a plurality of engagement sections each having a surface disposed substantially normal to a radial projecting from an elongate axis and a plurality of stiffening sections having a surface disposed substantially parallel to a radial projecting from the elongate axis and configured to prevent one of the: (i) insertion of a non-mating connector between the socket and basket of the other of the pair of mating connectors and (ii) misalignment of the pair of mating connectors during assembly of the mating connectors, wherein the insert inhibits plastic deformation of at least one of the axially projecting fingers of the pair of mating connectors and promotes alignment of the mating connectors.

7. The connector of claim 6 wherein the stiffening sections project radially inward relative to the engagement sections such that the stiffening sections inhibit insertion of the non-mating connector.

8. The connector of claim 7 wherein the stiffening sections are sufficiently rigid to prevent project radially inward relative to the engagement sections such that the stiffening sections inhibit insertion of the non-mating connector.

9. The connector of claim 8 wherein the stiffening sections inhibit plastic deformation of at least one of the axially projecting fingers of the pair of mating connectors and promote alignment of the pair of mating connectors.

10. An insert configured to inhibit plastic deformation of at least one axially projecting finger of an outer conductor basket associated with an RF connector, comprising:

an outwardly facing flange configured to engage a shoulder formed at a base of axially projecting fingers of the outer conductor basket, and defining:

a corrugated tubular structure comprising an elongate axis, wherein the corrugated tubular structure comprises, a plurality of engagement sections extending normal to the outwardly facing flange, each engagement section having a surface disposed substantially normally to a radial projecting from the elongate axis, and a plurality of stiffening sections having a surface disposed substantially parallel to a radial projecting from the elongate axis.

11. The insert of claim 10 wherein the outwardly facing flange includes an aperture configured to receive the axially-projecting fingers of an inner conductor socket.

12. The insert of claim 11 wherein each of the engagement sections is arcuate in cross-section and wherein each of the stiffening sections is radially inboard of an adjacent engagement section.

13. The insert of claim 10 wherein each stiffening section is interposed between a pair of engagement sections.

14. A method for preventing an inadvertent coupling improperly or non-mating connector portions, one of the connector portions having an inner conductor socket for transmitting RF signals across a connector interface and an outer conductor basket having at least one axially projecting finger to electrically ground the connector portions;

the method including the steps of:

structuring an inhibitor for insertion between the inner conductor socket and the outer conductor basket to prevent plastic deformation of at least one of the axially projecting fingers:

(i) when promoting alignment of the mating connector portions, or (ii) to prevent insertion of a non-mating connector portion, structuring the insert to include an outwardly facing flange to engage a shoulder formed at a base of the axially projecting fingers of the outer conductor basket, and to define a corrugated tubular structure comprising an elongate axis, wherein the corrugated tubular structure comprises, a plurality of engagement sections extending normal to the outwardly facing flange, each engagement section having a surface disposed substantially normally to a radial projecting from the elongate axis, and a plurality of stiffening sections having a surface disposed substantially parallel to a radial projecting from the elongate axis.

15. A method for preventing an inadvertent coupling improperly or non-mating connector portions, one of the connector portions having an inner conductor socket for transmitting RF signals across a connector interface and an outer conductor basket having at least one axially projecting finger to electrically ground the connector portions;

the method including the steps of:

configuring an inhibitor for insertion between the inner conductor socket and the outer conductor basket to prevent plastic deformation of at least one of the axially projecting fingers:

(i) when promoting alignment of the mating connector portions, or (ii) to prevent insertion of a non-mating connector portion, configuring the insert to include a tubular outer wall projecting normally from an outwardly facing flange, the outer wall defining:

(i) a plurality of engagement sections having a surface disposed substantially normal to a radial projecting from an elongate axis, and (ii) a plurality of stiffening sections having a surface disposed substantially parallel to a radial projecting from the elongate axis.

16. The method of claim 15 wherein the step of configuring the insert to include an outwardly facing flange further includes the step of defining an aperture to receive axially-projecting fingers of the inner conductor socket.

17. The method of claim 15 wherein the step of configuring the insert to include a tubular outer wall projecting normally from the outwardly facing flange further includes the step of:

configuring each of the engagement sections to be arcuate in cross-section and configuring each of the stiffening sections to be radially inboard of an adjacent engagement section.

* * * * *